United States Patent [19]

Katsuda et al.

[11] Patent Number: 4,745,283

[45] Date of Patent: May 17, 1988

[54] STIMULABLE PHOSPHOR SHEET TRANSFER APPARATUS WHICH INCLUDES FIRST AND SECOND SUCTION BOXES SEPARATELY CONNECTED TO A SECTION BLOWER AND A PAIR OF BUFFER TANKS

[75] Inventors: Satoshi Katsuda; Yasuhiro Kawai, both of Kanagawa, Japan

[73] Assignee: Fuji Photo Film Co., Ltd., Japan

[21] Appl. No.: 785,506

[22] Filed: Oct. 8, 1985

[30] Foreign Application Priority Data

Oct. 16, 1984 [JP] Japan .................................. 59-216906
Oct. 16, 1984 [JP] Japan .................................. 59-216907

[51] Int. Cl.[4] .............................................. G01T 1/105
[52] U.S. Cl. ............................ 250/327.2; 250/484.1; 271/197
[58] Field of Search ................. 250/327.2, 484.1, 337; 378/181, 187, 182, 173, 172; 271/197

[56] References Cited

U.S. PATENT DOCUMENTS

| 3,500,999 | 3/1970 | Lippke | 209/587 |
|---|---|---|---|
| 3,827,548 | 8/1974 | Matsuo | 198/689.1 |
| 4,258,264 | 3/1981 | Kotera et al. | 250/484.1 |
| 4,276,473 | 6/1981 | Kato et al. | 250/327.2 |
| 4,315,318 | 2/1982 | Kato et al. | 364/515 |
| 4,368,431 | 1/1983 | Rohr et al. | 324/464 |
| 4,387,428 | 6/1983 | Ishida et al. | 364/414 |
| 4,647,033 | 3/1987 | Emrich | 271/276 |

FOREIGN PATENT DOCUMENTS 59-33451 2/1984 Japan .................................. 378/181

Primary Examiner—Janice A. Howell
Assistant Examiner—Constantine Hannaher
Attorney, Agent, or Firm—Gerald J. Ferguson, Jr.; Michael P. Hoffman; Michael J. Foycik, Jr.

[57] ABSTRACT

A stimulable phosphor sheet transfer apparatus for transferring a stimulable phosphor sheet storing therein a radiation image information in a sub-scanning direction when the stimulable phosphor sheet is scanned with a stimulating ray along a main scanning line substantially perpendicular to the sub-scanning direction to emit light in the pattern of the stored radiation energy, the light emitted from the stimulable phosphor sheet being detected to obtain an image information signal, comprises a transfer belt for transferring the stimulable phosphor sheet in the sub-scanning direction, and first and second suction boxes disposed below the transfer belt and adapted to provide a suction force for attracting the stimulable phosphor sheet against the transfer belt. The first and second suction boxes are respectively disposed upstream and downstream of the main scanning line with respect to the sub-scanning direction. Said first and second suction boxes are separately connected to a suction blower respectively by way of switching valves, and a pair of buffer tanks are provided respectively between the first suction box and the switching valve corresponding thereto and between the second suction box and the switching valve corresponding thereto.

6 Claims, 2 Drawing Sheets

PRIOR ART FIG.1
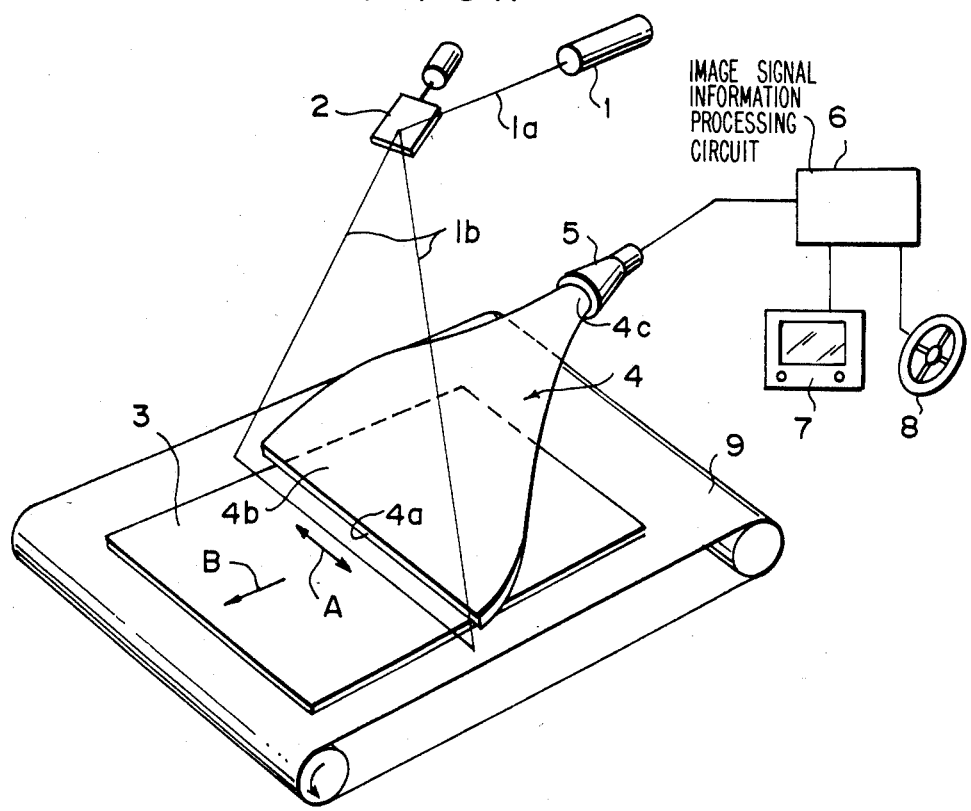
PRIOR ART FIG.2
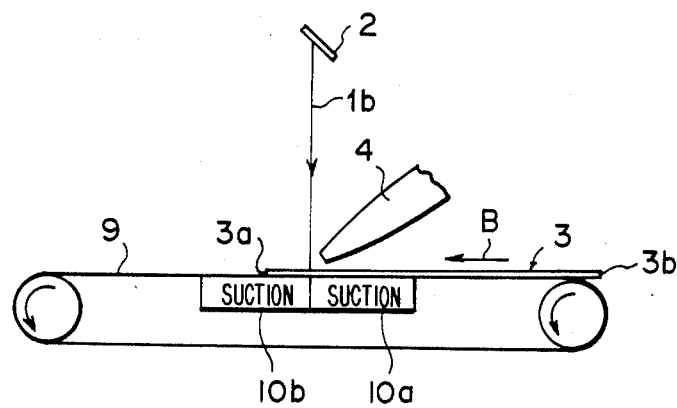

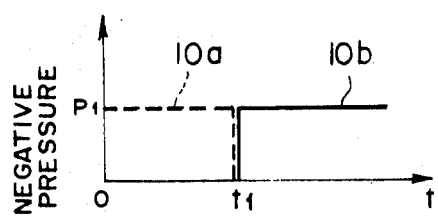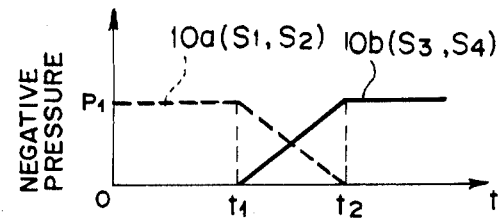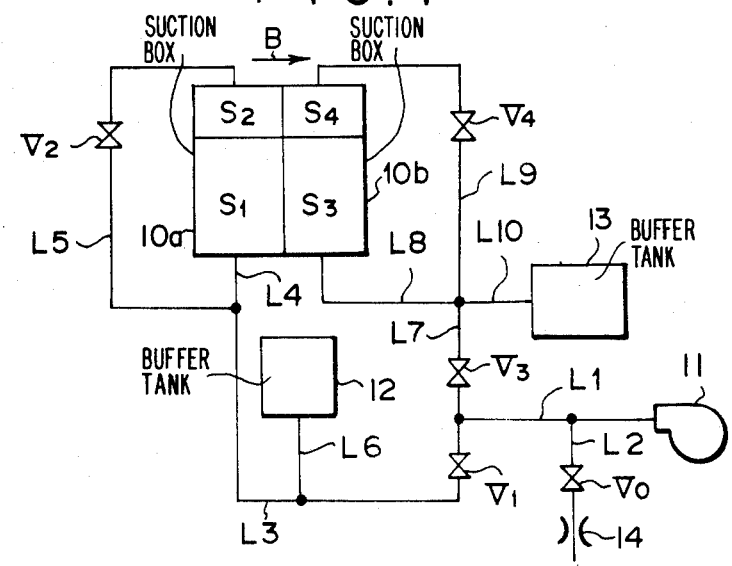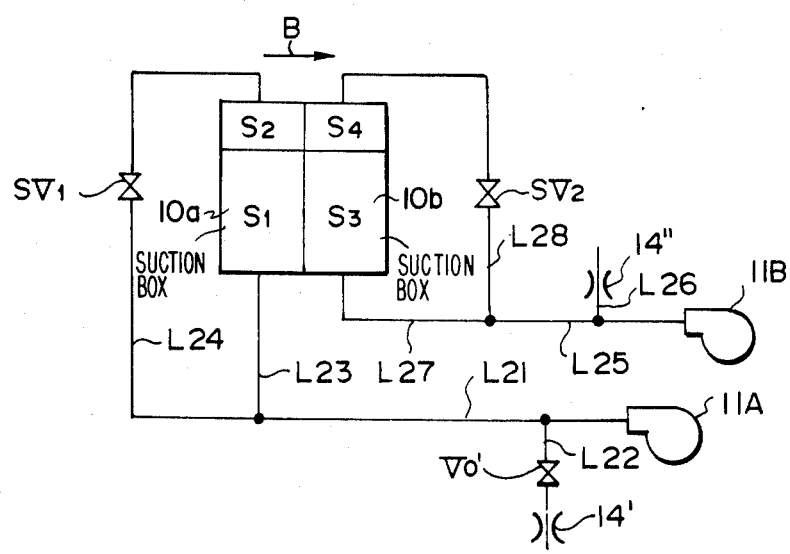

STIMULABLE PHOSPHOR SHEET TRANSFER APPARATUS WHICH INCLUDES FIRST AND SECOND SUCTION BOXES SEPARATELY CONNECTED TO A SECTION BLOWER AND A PAIR OF BUFFER TANKS

BACKGROUND OF THE INVENTION

1. Field of the Invention

This invention relates to a stimulable phosphor sheet transfer apparatus for transferring a stimulable phosphor sheet in a radiation image recording/reproducing system in which the stimulable phosphor sheet is exposed to radiation through an object and is scanned with a stimulating ray to emit light in the pattern of the stored energy of radiation, and more particularly to a stimulable phosphor sheet transfer apparatus for transferring a stimulable phosphor sheet in such a radiation image recording/reproducing system during radiation image information reading operation in which the light emitted from the stimulable phosphor sheet upon exposure to the stimulating ray is detected to obtain an image signal.

2. Description of the Prior Art

When certain kinds of phosphors are exposed to radiation such as X-rays, $\alpha$-rays, $\beta$-rays, $\gamma$-rays, cathode rays or ultraviolet rays, they store a part of the energy of the radiation. Then when the phosphor which has been exposed to the radiation is exposed to a stimulating ray such as a visible ray, light is emitted from the phosphor in the pattern of the stored energy of the radiation. A phosphor exhibiting such properties is referred to as a stimulable phosphor and a sheet material bearing thereon a stimulable phosphor layer is referred to as a "stimulable phosphor sheet" and can be used as a recording medium for recording thereon a radiation image information.

There has been proposed a radiation image information recording/reproducing system in which a radiation image of an object is once recorded on a stimulable phosphor sheet as a pattern of stored energy of radiation, the stimulable phosphor sheet is scanned with a stimulating ray, and light emitted from the stimulable phosphor sheet is photoelectrically detected to obtain an image signal which is subsequently processed to reproduce a visible radiation image of the object. For example, see Japanese Unexamined Patent Publication No. 56(1981)-11395, U.S. Pat. Nos. 4,258,264, 4,315,318, 4,387,428 and 4,276,473. The image signal can be reproduced as a hard copy or a visible image on a cathode ray tube, for instance.

FIG. 1 shows an example of a radiation image information reading device for use in such radiation image recording/reproducing systems.

In FIG. 1, a laser beam $1a$ (as the stimulating ray) of a predetermined intensity emitted from a laser source 1 is caused to impinge upon a galvanometer mirror 2. The laser beam $1a$ is deflected, as indicated at $1b$, by the galvanometer mirror 2 to sweep a stimulable phosphor sheet 3 below the galvanometer mirror 2 in the direction of arrow A (main scanning) while the stimulable phosphor sheet 3 is transferred by an endless belt 9 in the direction of arrow B (sub-scanning) perpendicular to the direction of the main scanning. That is, the stimulable phosphor sheet 3 is two-dimensionally scanned with the deflected laser beam $1b$. The parts of the stimulable phosphor sheet 3 exposed to the stimulating laser beam $1b$ emit light according to the energy of radiation stored therein. The light emitted from the stimulable phosphor sheet 3 upon exposure to the stimulating laser beam $1b$ enters a light guide member 4 having a light incident face $4a$ disposed near the stimulable phosphor sheet 3 to extend in parallel to the main scanning line. The light guide member 4 is flat in shape at the front portion $4b$ thereof and substantially cylindrical at the rear portion $4c$ thereof. To the rear portion $4c$ of the light guide member 4 is connected a photomultiplier 5 and the light entering the light guide member 4 from the light incident face $4a$ impinges upon the photomultiplier 5. The photomultiplier 5 converts the light into an electric signal and delivers it to an image signal information processing circuit 6. The image signal thus obtained is reproduced as a visible image on a CRT 7 or stored in a magnetic recording tape in this particular example.

If an end portion of the stimulable phosphor sheet 3 curls upward away from the surface of the endless belt 9 or an intermediate portion of the stimulable phosphor sheet 3 is raised upward from the surface of the endless belt 9 while the stimulable phosphor sheet 3 is transferred to be two-dimensionally scanned with the stimulating laser beam $1b$ in order to read the radiation image information stored in the stimulable phosphor sheet 3, the image to be read can be distorted and the stimulable phosphor sheet 3 can be interfered with the light guide member 4. In order to keep flat the stimulable phosphor sheet 3 during transfer for reading the radiation image information, suction force is applied to the stimulable phosphor sheet 3 through the endless belt 9. That is, as shown in FIG. 2, a large number of small holes are provided in the endless belt 9 and a negative pressure generated in first and second suction boxes $10a$ and $10b$ below the upper run of the endless belt 9 is applied to the stimulable phosphor sheet 3 through the holes to attract the stimulable phosphor sheet 3 against the surface of the endless belt 9. If only one suction box is provided below the upper run of the endless belt 9, the negative pressure applied to the stimulable phosphor sheet 3 will fluctuate until the stimulable phosphor sheet 3 comes to entirely cover the suction box. This is the reason why a pair of suction boxes $10a$ and $10b$ are provided. That is, the first and second suction boxes $10a$ and $10b$ bound with each other along the scanning line of the stimulating laser beam $1b$. No negative pressure is generated until the leading edge of the stimulable phosphor sheet 3 reaches the downstream edge of the first suction box $10a$, i.e., until the first suction box $10a$ is entirely covered with the stimulable phosphor sheet 3. Thereafter, when the second suction box $10b$ is entirely covered with the stimulable phosphor sheet 3, the negative pressure in the first suction box $10a$ is removed and a negative pressure is generated in the second suction box $10b$. The negative pressure in the second suction box $10b$ is maintained until scanning of the stimulable phosphor sheet 3 with the stimulating laser beam $1b$ is completed. Thus, the stimulable phosphor sheet 3 is kept in close contact with the surface of the endless belt 9 by a negative pressure applied by one of the suction boxes $10a$ and $10b$ from the beginning to the end of scanning of the stimulable phosphor sheet 3.

As shown in FIG. 3A, at the time t1 when the second suction box $10b$ - is entirely covered with the stimulable phosphor sheet 3, the negative pressure in the first suction box $10a$ is abruptly lowered from a predetermined value P1 to zero and at the same time, a negative pressure of the predetermined value P1 is abruptly generated in the second suction box 10b. This is to reduce fluctuation in load on the transfer means. That is, when the stimulable phosphor sheet 3 is attracted against the endless belt 9 under the force of negative pressure, load is exerted on the transfer means including the endless belt due to resistance produced between the endless belt and the suction box in operation, and accordingly the load on the transfer means fluctuates with the number of suction box in operation.

However, when the pressures in the first and second suction boxes 10a and 10b are abruptly changed in the manner described above, transfer speed of the stimulable phosphor sheet 3 changes to cause density fluctuation in a reproduced image in the direction of the sub-scanning.

SUMMARY OF THE INVENTION

In view of the foregoing observations and description, the primary object of the present invention is to provide a stimulable phosphor sheet transfer apparatus in which the load on the transfer apparatus and the transfer speed of the stimulable phosphor sheet experience substantially no change throughout the reading operation in the radiation image reading/reproducing system.

The stimulable phosphor sheet transfer apparatus in accordance with the present invention is for transferring a stimulable phosphor sheet storing therein a radiation image information in a sub-scanning direction when the stimulable phosphor sheet is scanned with a stimulating ray along a main scanning line substantially perpendicular to the sub-scanning direction to emit light in the pattern of the stored radiation energy, the light emitted from the stimulable phosphor sheet being detected to obtain an image information signal, and comprises a transfer belt for transferring the stimulable phosphor sheet in the sub-scanning direction, and first and second suction boxes disposed below the transfer belt and adapted to provide a suction force for attracting the stimulable phosphor sheet against the transfer belt, the first and second suction boxes being respectively disposed upstream and downstream of the main scanning line with respect to the sub-scanning direction, characterized, in one aspect of the present invention, in that said first and second suction boxes are separately connected to a suction blower respectively by way of switching valves, and a pair of buffer tanks are provided respectively between the first suction box and the switching valve corresponding thereto and between the second suction box and the switching valve corresponding thereto.

In another aspect, the stimulable phosphor sheet transfer apparatus of the present invention is characterized in that said first and second suction boxes are communicated with separate suction blowers.

BRIEF DESCRIPTION OF THE DRAWINGS

FIG. 1 is a schematic view showing an example of the radiation image recording/reproducing system in which the stimulable phosphor sheet transfer apparatus in accordance with the present invention is employed, FIG. 2 is a fragmentary side view showing a part of the radiation image recording/reproducing system of FIG. 1, FIGS. 3A and 3B are graphs for illustrating the difference between the operation of the stimulable phosphor sheet transfer apparatus of the present invention and that of the conventional stimulable phosphor sheet transfer apparatus, FIG. 4 is an air circuit diagram of a stimulable phosphor sheet transfer apparatus in accordance with an embodiment of the present invention, and FIG. 5 is an air circuit diagram of a stimulable phosphor sheet transfer apparatus in accordance with another embodiment of the present invention.

DESCRIPTION OF THE PREFERRED EMBODIMENTS

A stimulable phosphor sheet transfer apparatus in accordance with a first embodiment of the present invention will be described with reference to FIG. 4. The stimulable phosphor sheet transfer apparatus of this embodiment differs from the stimulable phosphor sheet transfer apparatus shown in FIGS. 1 and 2 in the air circuit for providing suction force to the first and second suction boxes, and accordingly description will be made mainly on the air circuit, hereinbelow. In FIG. 4, the parts corresponding to the parts shown in FIGS. 1 to 3 are given the same reference numerals. The first suction box 10a has a first compartment S1 and a second compartment S2 and similarly, the second suction box 10b has a first compartment S3 and a second compartment S4. When the stimulable phosphor sheet to be transferred is relatively small in width, only the first compartment of the first suction box 10a and the first compartment of the second suction box 10b are connected to a suction blower 11 to be described later. On the other hand, when the stimulable phosphor sheet to be transferred is relatively large in width, both the compartments S1 and S2 of the first suction box 10a and both the compartments S3 and S4 of the second suction box 10b are connected to the suction blower 11. This switching is accomplished by solenoid valves V2 and V4 as will become apparent later.

An air passage L1 extends from the suction blower 11 and an air passage L3 is connected to the air passage L1 at one end. To the other end of the air passage L3 are connected air passages L4 and L5 respectively extending from the first compartment S1 and the second compartment S2 of the first suction box 10a. A solenoid valve V1 for closing and opening the air passage L3 is disposed in the air passage L3, and said solenoid valve V2 is disposed in the air passage L5. An air passage L7 is connected to the air passage L1 at one end. To the other end of the air passage L7 are connected air passages L8 and L9 respectively extending from the first compartment S3 and the second compartment S4 of the second suction box 10b. A solenoid valve V3 for closing and opening the air passage L7 is disposed in the air passage L7, and said solenoid valve V4 is disposed in the air passage L9.

An air passage L2 is connected to the air passage L1 at one end and opens to the atmosphere by way of an orifice 14 at the other end. A suction force changing solenoid valve V0 is disposed in the air passage L2 between the junction of the air passage L2 to the air passage L1 and the orifice 14. The suction force or the negative pressure provided to the air passage L1 is changed between "strong" and "weak" by opening and closing the suction force changing solenoid valve V0. The air passage L3 is connected to a first buffer tank 12 by way of an air passage L6 and the air passage L7 is connected to a second buffer tank 13 by way of an air passage L10.

In FIG. 2, the stimulable phosphor sheet 3 bearing thereon a radiation image information is fed to the endless belt 9 from the right side as shown in FIG. 2 and is transferred on the endless belt 9. At this time the solenoid valve V1 is opened and the suction blower 11 is communicated with the compartments S1 and S2 of the first suction box 10a by way of the air passages L1, L3, L4 and L5 to provide a suction force to the stimulable phosphor sheet 3 through the small holes in the endless belt 9 to attract the stimulable phosphor sheet 3 against the endless belt 9. When the stimulable phosphor sheet 3 is relatively small in width, the solenoid valves V2 and V4 are closed not to provide suction force to the compartments S2 and S4 irrespective of opening and closure of the solenoid valves V1 and V3. Until the leading edge 3a of the stimulable phosphor sheet 3 reaches the scanning line of the stimulating ray 1b, reading of the radiation image information is not effected and accordingly change in transfer speed does not affect reading of the image information. Therefore, the suction force changing solenoid valve V0 is closed to increase the suction force applied to the stimulable phosphor sheet 3 so that the stimulable phosphor sheet 3 can be attracted against the endless belt 9 with a sufficient force even if the first suction box 10a (the compartments S1 and S2, or the compartment S1) is not entirely covered with the stimulable phosphor sheet 3 and so that the stimulable phosphor sheet 3 can be positively attracted against the endless belt 9 even if the stimulable phosphor sheet 3 curls away from the surface of the endless belt 9.

After the leading edge 3a of the stimulable phosphor sheet 3 reaches the scanning line of the stimulating ray 1b and immediately before starting of reading of the radiation image information, the suction force changing solenoid valve V0 is opened to permit draw of air from the outside by way of the orifice 14 and the negative pressure in the air passage L1 is adjusted to a predetermined value determined by the diameter of the orifice 14. Since the first suction box 10a is entirely covered with the stimulable phosphor sheet 3 at this time, the stimulable phosphor sheet 3 is attracted against the endless belt 9 by the suction force applied thereto through the small holes in the endless belt from the entire area of the suction box 10a, whereby the part of the stimulable phosphor sheet 3 to be scanned is kept flat.

In this condition, the stimulable phosphor sheet 3 is transferred by the endless belt 9, and after the stimulable phosphor sheet 3 comes to entirely cover the second suction box 10b (the first and second compartments S3 and S4, or the first compartment S3), and while the stimulable phosphor sheet 3 still entirely covers the first suction box 10a, the solenoid valve V1 is closed and the solenoid valve V3 is opened to interrupt feeding of the suction force to the first suction box 10a and to start feeding of the suction force to the second suction box 10b. Thus, the negative pressure in the first suction box 10a is reduced to zero, and the second suction box 10b is provided with a negative pressure of the predetermined value P1. However, in this embodiment, the pressures in the respective suction boxes 10a and 10b gradually change as shown in FIG. 3B. The rates of change in the pressure in the suction boxes 10a and 10b depends upon the capacity of the suction blower 11 and the volumes of the buffer tanks 12 and 13. By gradually changing the pressure in the suction boxes 10a and 10b, change in the transfer speed can be prevented.

Now, a stimulable phosphor sheet transfer apparatus in accordance with a second embodiment of the present invention will be described with reference to FIG. 5. Also the stimulable phosphor sheet transfer apparatus of this embodiment differs from the stimulable phosphor sheet transfer apparatus shown in FIGS. 1 and 2 in the air circuit for providing suction force to the first and second suction boxes, and accordingly description will be made mainly on the air circuit, hereinbelow. In FIG. 5, the parts corresponding to the parts shown in FIGS. 1 to 3 are given the same reference numerals. The first suction box 10a has a first compartment S1 and a second compartment S2 and similarly, the second suction box 10b has a first compartment S3 and a second compartment S4. When the stimulable phosphor sheet to be transferred is relatively small in width, only the first compartment of the first suction box 10a and the first compartment of the second suction box 10b are provided with a suction force. On the other hand, when the stimulable phosphor sheet to be transferred is relatively large in width, both the compartments S1 and S2 of the first suction box 10a and both the compartments S3 and S4 of the second suction box 10b are provided with a suction force. This switching is accomplished by solenoid valves SV1 and SV2 as will become apparent later.

An air passage L21 extends from a first suction blower 11A and air passages L23 and L24 are connected to the air passage L21 at one end. The other ends of the air passage L23 and L24 are respectively connected to the first compartment S1 and the second compartment S2 of the first suction box 10a. Said solenoid valve SV1 is disposed in the air passage L24. An air passage L22 is connected to the air passage L21 at one end and opens to the atmosphere by way of an orifice 14' at the other end. A suction force changing solenoid valve V0' is disposed in the air passage L22 between the junction of the air passage L22 to the air passage L21 and the orifice 14'. The suction force or the negative pressure provided to the air passage L21 is changed between "strong" and "weak" by opening and closing the suction force changing solenoid valve V0'.

An air passage L25 extends from a second suction blower 11B and air passages L27 and L28 are connected to the air passage L25 at one end. The other ends of the air passage L27 and L28 are respectively connected to the first compartment S3 and the second compartment S4 of the first suction box 10a. Said solenoid valve SV2 is disposed in the air passage L28. An air passage L26 is connected to the air passage L25 at one end and opens to the atmosphere by way of an orifice 14" at the other end.

In FIG. 2, the stimulable phosphor sheet 3 bearing thereon a radiation image information is fed to the endless belt 9 from the right side as shown in FIG. 2 and is transferred on the endless belt 9. At this time the first suction blower 11A is operated to generate a suction force which is applied by way of the first suction box 10a to the stimulable phosphor sheet 3 through the small holes in the endless belt 9 to attract the stimulable phosphor sheet 3 against the endless belt 9. When the stimulable phosphor sheet 3 is relatively small in width, the solenoid valves SV1 and SV2 are closed not to provide suction force to the compartments S2 and S4. Until the leading edge 3a of the stimulable phosphor sheet 3 reaches the scanning line of the stimulating ray 1b, reading of the radiation image information is not effected and accordingly change in transfer speed does not affect reading of the image information. Therefore, the suction force changing solenoid valve V0' is closed to increase the suction force applied to the stimulable phosphor sheet 3 so that the stimulable phosphor sheet 3 can be attracted against the endless belt 9 with a sufficient force even if the first suction box 10a (the compartments S1 and S2, or the compartment S1) is not entirely covered with the stimulable phosphor sheet 3 and so that the stimulable phosphor sheet 3 can be positively attracted against the endless belt 9 even if the stimulable phosphor sheet 3 curls away from the surface of the endless belt 9.

After the leading edge 3a of the stimulable phosphor sheet 3 reaches the scanning line of the stimulating ray 1b and immediately before starting of reading of the radiation image information, the suction force changing solenoid valve V0' is opened to permit draw of air from the outside by way of the orifice 14' and the negative pressure in the air passage L21 is adjusted to a predetermined value determined by the diameter of the orifice 14'. Since the first suction box 10a is entirely covered with the stimulable phosphor sheet 3 at this time, the stimulable phosphor sheet 3 is attracted against the endless belt 9 by the suction force applied thereto through the small holes in the endless belt from the entire area of the suction box 10a, whereby the part of the stimulable phosphor sheet 3 to be scanned is kept flat.

In this condition, the stimulable phosphor sheet 3 is transferred by the endless belt 9, and after the stimulable phosphor sheet 3 comes to entirely cover the second suction box 10b (the first and second compartments S3 and S4, or the first compartment S3), and while the stimulable phosphor sheet 3 still entirely covers the first suction box 10a, the first suction blower 11A is stopped and the second suction blower 11B is operated to interrupt feeding of the suction force to the first suction box 10a and to start feeding of the suction force to the second suction box 10b. Thus, the negative pressure in the first suction box 10a is reduced to zero, and the second suction box 10b is provided with a negative pressure of the predetermined value P1. However, in this embodiment, the pressures in the respective suction boxes 10a and 10b gradually change as shown in FIG. 3B since the first suction blower 11A gradually reduces its rotational speed after it is deenergized and the second suction blower 11B increases its rotational speed when it is energized. By gradually changing the pressure in the suction boxes 10a and 10b, change in the transfer speed can be prevented.

We claim:

1. A stimulable phosphor sheet transfer apparatus for transferring a stimulable phosphor sheet storing therein a radiation image information in a sub-scanning direction when the stimulable phosphor sheet is scanned with a stimulating ray along a main scanning line substantially perpendicular to the sub-scanning direction to emit light in the pattern of the stored radiation energy, the light emitted from the stimulable phosphor sheet being detected to obtain an image information signal, comprising a transfer belt for transferring the stimulable phosphor sheet in a sub-scanning direction, and first and second suction boxes disposed below the transfer belt and adapted to provide a suction force for attracting the stimulable phosphor sheet against the transfer belt, the first and second suction boxes being respectively upstream and downstream of the main scanning line with respect to the sub-scanning direction, characterized in that said first and second suction boxes are separately connected to a section blower respectively by way of switching valves, and a pair of buffer tanks are provided respectively between the first suction box and the switching valve corresponding thereto and between the second suction box and the switching valve corresponding thereto, so that the suction applied to the first suction box gradually decreases and the suction applied to the second box gradually increases as the stimulable phosphor sheet is transferred across said main scanning line due to said first and second buffer tanks.

2. A stimulable phosphor sheet transfer apparatus as defined in claim 1 in which each of said first and second suction boxes are divided into two compartments extending in he sub-scanning direction in parallel to each other, and when said stimulable phosphor sheet to be transferred is relatively small in width, only one of the compartments of each suction box is provided with the suction force from the suction blower, and when the stimulable phosphor sheet to be transferred is relatively large in width, both the compartments of each suction box are provided with the suction force from the suction blower.

3. A stimulable phosphor transfer apparatus for transferring a stimulable phosphor sheet storing therein a radiation image information in a sub-scanning direction when the stimulable phosphor sheet is scanned with a stimulating ray along a main scanning line substantially perpendicular to the sub-scanning direction to emit light in the pattern of the stored radiation energy, the light emitted from the stimulable phosphor sheet being detected to obtain an image information signal, comprising a transfer belt for transferring the stimulable phosphor sheet in the sub-scanning direction, and first and second suction boxes disposed below the transfer belt and adapted to provide a suction force for attracting the stimulable phosphor sheet against the transfer belt, the first and second suction boxes being respectively disposed upstream and downstream of the main scanning line with respect to the sub-scanning direction, charcterized in that said first and second suction box are communicated with separate suction blowers, where the suction applied to said main scanning line by said first blower is decreased while the suction applied to said main scanning line by said second blower is increased as the stimulable phosphor sheet is transferred across the main scanning line.

4. A stimulable phosphor sheet transfer apparatus as defined in claim 3 in which each of said first and second suction boxes are divided into two compartments extending in the sub-scanning direction in parallel to each other, and when said stimulable phosphor sheet to be transferred is relatively small in width, only one of the compartments of each suction box is provided with the suction force from the suction blower, and when the stimulable phosphor sheet to be transferred is relatively large in width, both the compartments of each suction box are provided with the suction force from the suction blower.

5. A stimulable phosphor sheet transfer apparatus as defined in claim 1 where the suction applied to said main scanning line by said first and second suction boxes is substantially constant as the stimulable phosphor sheet is transferred across said main scanning line, due to said first and second buffer tanks.

6. A stimulable phosphor sheet transfer apparatus as defined in claim 3, where the suction applied to said main scanning line by said first and second suction boxes is substantially constant as the stimulable phosphor sheet is transferred across said main scanning line, due to said first and second blowers.

* * * * *